United States Patent [19]

Knuaf et al.

[11] 4,214,027
[45] Jul. 22, 1980

[54] PROCESS FOR THE PRODUCTION OF FIBER-CONTAINING PLASTER BOARDS

[75] Inventors: Alfons Knuaf, Saar; Jorg Bold, Kaiserslautern; Siegfried Franke, Ochsenfurt, all of Fed. Rep. of Germany

[73] Assignee: Gebr. Knauf Westdeutsche Gipswerke, Iphofen, Fed. Rep. of Germany

[21] Appl. No.: 24,336

[22] Filed: Mar. 27, 1979

Related U.S. Application Data

[63] Continuation of Ser. No. 782,716, Mar. 29, 1977, abandoned.

[30] Foreign Application Priority Data

Apr. 1, 1976 [DE] Fed. Rep. of Germany ....... 2613976

[51] Int. Cl.² .......................... B32B 5/12; B32B 3/18; B32B 31/14
[52] U.S. Cl. ................................... 428/113; 428/114; 428/246; 156/42; 156/45
[58] Field of Search ............................ 156/42, 44, 45; 428/113, 114, 246

[56] References Cited

U.S. PATENT DOCUMENTS

| | | | |
|---|---|---|---|
| 3,216,881 | 11/1965 | Pfeifer et al. | 428/114 |
| 3,944,698 | 3/1976 | Dierks et al. | 156/42 |
| 4,065,597 | 12/1977 | Gillespie | 156/42 |

FOREIGN PATENT DOCUMENTS

1204541 9/1970 United Kingdom .

*Primary Examiner*—William R. Dixon, Jr.
*Attorney, Agent, or Firm*—Millen & White

[57] ABSTRACT

Fiber containing plaster boards are prepared by superimposing a plurality of board blanks one on top of the other such that the direction of the fiber orientation in the superimposed blanks deviates one from the other. The board blanks are formed in a conventional manner from a suspension of calcium sulfate capable of setting, reinforcing fibers and a quantity of water beyond the quantity of water necessary for setting the calcium sulfate capable of setting. After mechanically removing excess water from the suspension to form the board blanks, two or more of these blanks are placed one on top of the other and are connected under pressure and dried. Thereafter, a predetermined number of board blanks having a direction of the fiber orientation deviating one from the other, are placed one on top of the other and are pressed together prior to or during the setting of the calcium sulfate.

17 Claims, No Drawings

PROCESS FOR THE PRODUCTION OF FIBER-CONTAINING PLASTER BOARDS

This is a continuation of application Ser. No. 782,716, filed Mar. 29, 1977, now abandoned.

Fire protection regulations, improved for the benefit of the population, increasingly require the use of fire proof or fire retardant building materials in the construction of buildings and other structures. In many cases gypsum has been found to be particularly suitable for this purpose, since on heating it uses up considerable quantities of energy by dehydration. Thus, for example, partitions may be made of plaster boards with a fire resistance of $F^{30-120}$ according to DIN 4102. Hitherto this use of gypsum articles and plaster boards however has been limited to those cases where no high degree of strength, especially buckling compression resistance and bending strength, has been required.

In order to aleviate this disadvantage, the generally known and used doctrine of inserting fibers, especially fibers of high tensile strength, into the molded masses, has been used for the production of molded articles of gypsum. The molded articles produced from these masses are distinguished particularly by a high degree of bending strength. Such a process of the production of construction boards has been described, for example, in British Patent No. 1,204,541. According to that patent, glass fibers of 3.5 to 5.0 cm in a quantity of 7 to 15% by weight are distributed in a gypsum-water suspension, which contains an excess of water beyond the quantity required for the setting of the gypsum. The suspension is poured into a strainer mold and the excess of water is removed so as to form a construction unit, which is subsequently formed out. These construction units have a high bending strength of 2.00 to 3.00 kg/cm². This process however, especially in case of stronger structures, requires a relatively long residence time in the molds employed for their formation.

According to the process described in German Patent 1,104,419, a suspension consisting of gypsum, fibers and water is applied in a thin layer to a permeable conveyer belt, beneath which means are provided for removing excess water. The fleece obtained in this manner is then wound in several superimposed layers onto a format roller to form a board-blank which is taken off by the format roller and dried. According to this process, generally only boards up to a thickness of 2.0 to 3.0 cm may be produced.

From the German OS No. 2,425,276, a variation of this process has been known. According to that disclosure, cellulose fibers as well as asbestos fibers are admixed with a gypsum-water suspension. These additives and their combination are said to be indispensable for the success of the process. From these gypsum-fiber-water suspensions, a fleece of about 0.2 to 0.3 cm thickness is again formed which, superposed in several layers, is again molded under pressure into a board blank and subsequently is dried. The thickness of the boards produced according to this process is likewise limited on the basis of the production process. Moreover, in the case of these boards the fibers are oriented in only one direction. As a result, there will be an anisotropy of the bending strength in case of these boards. The same holds true for boards produced according to Germam Patent No. 1,104,419.

The thickness of the boards produced by the above processes is not sufficient for numerous applications. Thus, for example, they are not thick enough for use as so-called double-bottom (floor) elements with which, as is well known, subsoil installations are covered up. Boards to be used for this purpose should be characterized by a high fiber resistance, a high degree of strength, a low weight, and a relatively high thickness. In order to achieve a greater thickness of boards for this end use, it has been recommended to glue a plurality of boards produced according to the previously known processes on one another after setting and drying, by means of inorganic or organic binders. This procedure, however, requires additional operating steps and an additional expenditure of energy, in order to bring about the drying of the glued boards.

Therefore, it is an object of the present invention to produce fiber reinforced plaster boards which, in addition to the required fire-resistance, are characterized by a low weight and a high degree of strength.

It is another object of the invention to provide high strength, light weight, fiber reinforced plaster boards having increased bending strength in at least one direction of expansion.

Yet another object is to provide fiber reinforced plaster boards having a high bending strength in every direction of expansion.

Another object is to provide fiber reinforced plaster boards having a predetermined thickness and directional bending strength.

These and other objects and advantages are accomplished by means of the invention wherein fiber containing plaster boards are prepared by superimposing a plurality of board blanks one on top of the other such that the direction of the fiber orientation in the superimposed blanks deviates one from the other. Thus, the fiber containing plaster boards of the invention are made by forming board blanks in a conventional manner from a suspension of calcium sulfate capable of setting, reinforcing fibers and a quantity of water beyond the quantity of water necessary for setting the calcium sulfate capable of setting. After mechanically removing excess water from the suspension to form board blanks, two or more of these blanks are placed one on top of the other and are connected under pressure and dried. Thereafter, a predetermined number of board blanks having a direction of the fiber orientation deviating one from the other, are placed one on top of the other and are pressed together prior to or during the setting of the calcium sulfate.

The board blanks to be used as starting material for carrying out the process of the invention are to consist of calcium sulfates capable of setting, preferably calcium sulfate hemihydrate reinforcing fibers and water, and are to be used at a time when the calcium sulfate capable of setting has not yet, or not yet completely set. Board blanks which are obtained according to the process of the German Patent No. 1,104,419 from a suspension of calcium sulfate hemihydrate, fibers and a quantity of water in excess of that required for the calcium sulfate capable of setting may be used. For this purpose, this suspension can be applied in a thin layer, advantageously onto a conveyer belt permeable by water, beneath which means for removing or sucking off excess water have been disposed. After removing excess water, the fleece remaining on the conveyer belt is wound up onto a molding roller so as to form a multi-layered board blank, wherein the number of layers of fleece is selected so as to achieve a board blank of the desired thickness. It is essential to the present invention that the board blanks be removed from the format roller before the calcium sulfate in the blank which is capable of setting begins to set. It may, therefore, be advantageous to delay this setting of the calcium sulfate by additions to the suspension or by other suitable methods in a manner known per se. Moreover, whenever calcium sulfate hemihydrate is used as a calcium sulfate capable of setting, up to an additional 20% by weight, based on the weight of the calcium sulfate hemihydrate, of hydraulic cement such as portland cement or an anhydrite may be added to the calcium sulfate hemihydrate.

In the case of the above described previously known type of production of board blanks, cellulose fibers, asbestos fibers, glass fibers, synthetic fibers, rock wool or slag wool and the like may be used individually or in combination. The portion of fibers distributed as homogenously as possible in the board blanks should amount to 5% by weight, based on the weight of the end product. Within one layer, the orientation of the fiber in relation to the three coordinates x:y:z should amount to about a ratio of 1:0.7–0.3:0.05–0.2.

The board blanks obtained according to this manner of production may be produced only up to a thickness of 2 to 3 cm. However, conditional upon the production, they have a longitudinal orientation of the enclosed fibers which is in parallel to the direction of transportation the water permeable conveyor belt.

The longitudinal orientation of the fibers has a ratio of bending strength longitudinally: bending strength transversely of 1.8 to 1.3. Corresponding board blanks may also be obtained according to the process disclosed in the German OS No. 2,425,276.

Prior to or during the beginning of the setting of these board blanks, according to the present invention at least two of these blanks, and preferably three or more, with the direction of fiber orientation deviating one from the other, are placed on top of one another. Whenever boards with generally increased bending strength are to be produced wherein the bending strength measured along the length or the width of the board is to be particularly high, it will be of advantage to place the board blanks on top of one another in such a way that the direction of orientation of the fibers in these board blanks include an angle of below 90°, which opens up in the direction of the particularly high bending strength. A uniform increase of the strength values of a board will be achieved whenever an even number of board blanks, always with a fiber orientation changed by an angle of 90°, are placed on top of one another and pressed together.

A theoretically optimal arrangement of the fiber orientation, in the case of, for example, four boards, is 0°; 90°; 90°; 0°; or 0°; 90°; 270°; 180°. In practice, however, it has been found that better results may be achieved with the arrangement 0°; 90°; 0°; 90°; or 0°; 90°; 180°; 270°. The bending strength of these boards is equal to or greater than 150 kp/cm$^2$ and the elasticity modulus lies at or above 30,000 kp/cm$^2$. The isotropy of the bending strength in the horizontal space coordinates x:y has been determined at 1:1 to 1:0.8. The specific weight of the boards amounts to at least 1.2 g/cm$^3$ or more.

The molding together of the superposed board blanks is accomplished preferably with a pressure of 30 to 160, preferably of 40 to 80 bar. Generally a molding time of 1 to 5 minutes is sufficient. However, the molding time must be determined in every special case by simple, preliminary experimentation, since it also depends on the material structure, the setting behavior and other factors. The molding is carried out advantageously in a conventional hand press. For this purpose other arrangements with a similar effect may also be used. In the case when correspondingly shaped molds and dies are used, a predetermined shape or a surface structuring may be imparted to the boards.

It has proven particularly advantageous to stack the boards to be molded in such a way that the boards may be connected without binders solely by the molding and joint setting in a shear resistant and power-connected manner, so that high moments of strength will be achieved.

A further increase of the strength values of the boards produced according to the invention may be achieved whenever a layer of fibers or a fabric is inserted between two board blanks. This layer of fibers or fabric may consist of natural or synthetic fibers and, in particularly advantageous manner, may be saturated with a water suspension of calcium sulfate capable of setting. Such a suspension need only contain the quantity of water necessary for mixing.

As a result of the subsequent molding, the board blanks, and the layers of fiber or fabric if such layers are employed, are joined into a single board closed within itself, in which the calcium sulfate capable of setting and contained therein finally sets. The molding process thus should be harmonized with the setting of the calcium sulfate contained in the board blanks in such a way, that the final board has set into a stabile shape after the molding, thus permitting the transporation of the board with supporting conveying means to a drying arrangement. In this drying arrangement, the board is dried at decreasing temperatures of from 200° to 40° C. up to a free water content of 0 to 0.2% by weight.

Thus, the boards of the invention consist of several layers of fiber containing gypsum material molded together under pressure and connected in a shear-resistant manner. It is important that the orientation of the fibers in the individual layers of these boards deviate from one another. The directions of the fiber orientation of two adjacent layers will deviate particularly advantageously by 90°. In this manner, whenever a given board has an even number of layers, it will be characterized by a uniform bending strength in all directions of extension.

According to the process of the invention, plaster boards can be produced with simple measures and at low technical expenditure, which beside the required fire resistance, have a low weight as well as a high strength, especially bending strength. In this latter regard, the bending strength may be unformly increased in every direction of extension of the board. However, the possibility also exists of increasing the strength of the board generally and the bending strength particularly beyond that in one of its directions of extension. The boards produced according to the invention are eminently suitable as a construction material, especially as floor or cover up boards.

The invention will be understood more fully in view of the following examples, wherein the board blanks used as a starting material have been produced according to the German Patent 1,104,419.

EXAMPLE 1

Two square board blanks of 12 mm thickness are placed on top of one another with their fiber orientation changed by 90° and are molded prior to setting with a pressure of 40 kp/cm$^2$ for a duration of 2 minutes. Subsequently, the board obtained is dried at a temperature of 90° C. up to the residual content of free water of 0.1% by weight. The bending strength of the 20 mm thick board amounts in every direction of extension to 120 kp/cm².

EXAMPLE 2

Four square board blanks of 12 mm thickness are placed on top of one another always only with a fiber orientation changed by 90° and are molded for a duration of 2 minutes prior to setting with a pressure of 50 kp/cm². The board is then dried according to Example 1. The bending strength of the board amounts to 140 kp/cm² in every direction of extension.

EXAMPLE 3 (COMPARISON)

Two square board blanks are placed on top of one another with the same orientation of fibers and are further processed according to Example 1. The bending strength of the board obtained amounts in the direction of the fiber orientation of 170 kp/cm² and transversely to it to 100 kp/cm².

What is claimed is:

1. A monolithic, fiber-reinforced board which is sufficiently thick to be suitable for use as a floor element, which board comprises a plurality of layers each of which contains substantially homogeneously distributed reinforcing fibers and calcium sulfate binder, wherein the reinforcing fibers in each said layer are oriented predominantly in one direction, and wherein the direction of predominant fiber orientation in each layer deviates by about 90° from that in adjacent layers, said plurality of layers being molded together under pressure prior to the setting of the calcium sulfate binder to consolidate said layers into a monolithic, fiber-reinforced board.

2. The fiber containing board of claim 1, wherein the bending strength is substantially the same in each horizontal direction of extension of said board.

3. The fiber containing board of claim 2, wherein said board has a bending strength of at least 150 kp/cm², the isotropy of said bending strength in the horizontal space coordinates x:y is from 1:1 to 1:0.8, the elasticity modulus is at least 30,000 kp/cm², the density is at least 1.2 g/cm³, and the fiber content is from 5 to 25% by weight.

4. The fiber containing board of claim 1, wherein said board has bending strength of at least 150 kp/cm², the isotropy of said bending strength in the horizontal space coordinates x:y is from 1:1 to 1:0.8, the elasticity modulus is at least 30,000 kp/cm², the density is at least 1.2 g/cm³, and the fiber content is from 5 to 25% by weight.

5. In a process for producing a monolithic, fiber-reinforced board which is sufficiently thick to be suitable for use as a floor element, which process comprises the steps of superimposing a plurality of fiber-reinforced board blanks, molding and drying; the improvement which comprises:

(a) using as said plurality of board blanks uncured board blanks containing substantially homogeneously distributed reinforcing fibers, calcium sulfate binder and a quantity of water in excess of the quantity necessary for setting said binder, wherein the reinforcing fibers of each board blank are oriented predominantly in one direction;

(b) superimposing said uncured board blanks such that the direction of predominant fiber orientation in each board blank deviates by about 90° from that in adjacent board blanks, thereby substantially reducing the anisotropy of bending strength in the horizontal directions of extension in the molded product of step (c); and (c) molding the resultant superimposed board blanks under sufficient pressure prior to the setting of said calcium sulfate binder contained in said board blanks to form a monolithic fiber-reinforced board; whereby the steps of setting and drying the individual board blanks and then gluing together the resultant cured blanks are avoided.

6. The process of claim 5, wherein after setting, said monolithic plaster board is dried at from 200° C. to 400° C. to a free water content of from 0 to 0.2% by weight.

7. The process of claim 5, wherein the superposed board blanks are molded with a pressure of about 30 to 160 kp/cm².

8. The process of claim 5, wherein a layer of fibers or fabric is placed between two adjacent board blanks prior to superimposing said blanks.

9. The process of claim 8, further comprising impregnating said layer of fibers or fabric with a water suspension of calcium sulfate binder.

10. The process of claim 5, wherein said uncured board blanks are prepared by forming a fleece from said reinforcing fibers, said suspension of calcium sulfate binder and said quantity of water in excess of the quantity necessary for setting said binder, by mechanical removal of excess water, and layering said fleece to form a board blank of desired thickness.

11. The process of claim 10, wherein said fleece is formed on a continuous, water-permeable belt having means to remove excess water, layered on a molding roller to a desired thickness and removed from said roller before the calcium sulfate binder begins to set, thereby forming said uncured board blanks.

12. The process of claim 11, wherein the superposed board blanks are molded with a pressure of about 30 to 160 kp/cm².

13. The process of claim 11, wherein a layer of fibers or fabric is placed between two adjacent board blanks prior to superimposing said blanks.

14. The process of claim 13, further comprising impregnating said layer of fibers or fabric with a water suspension of calcium sulfate binder.

15. The process of claim 10, wherein the superposed board blanks are molded with a pressure of about 30 to 160 kp/cm².

16. The process of claim 10, wherein a layer of fibers or fabric is placed between two adjacent board blanks prior to superimposing said blanks.

17. The process of claim 16, further comprising impregnating said layer of fibers or fabric with a water suspension of calcium sulfate binder.

* * * * *